Patented Apr. 19, 1949

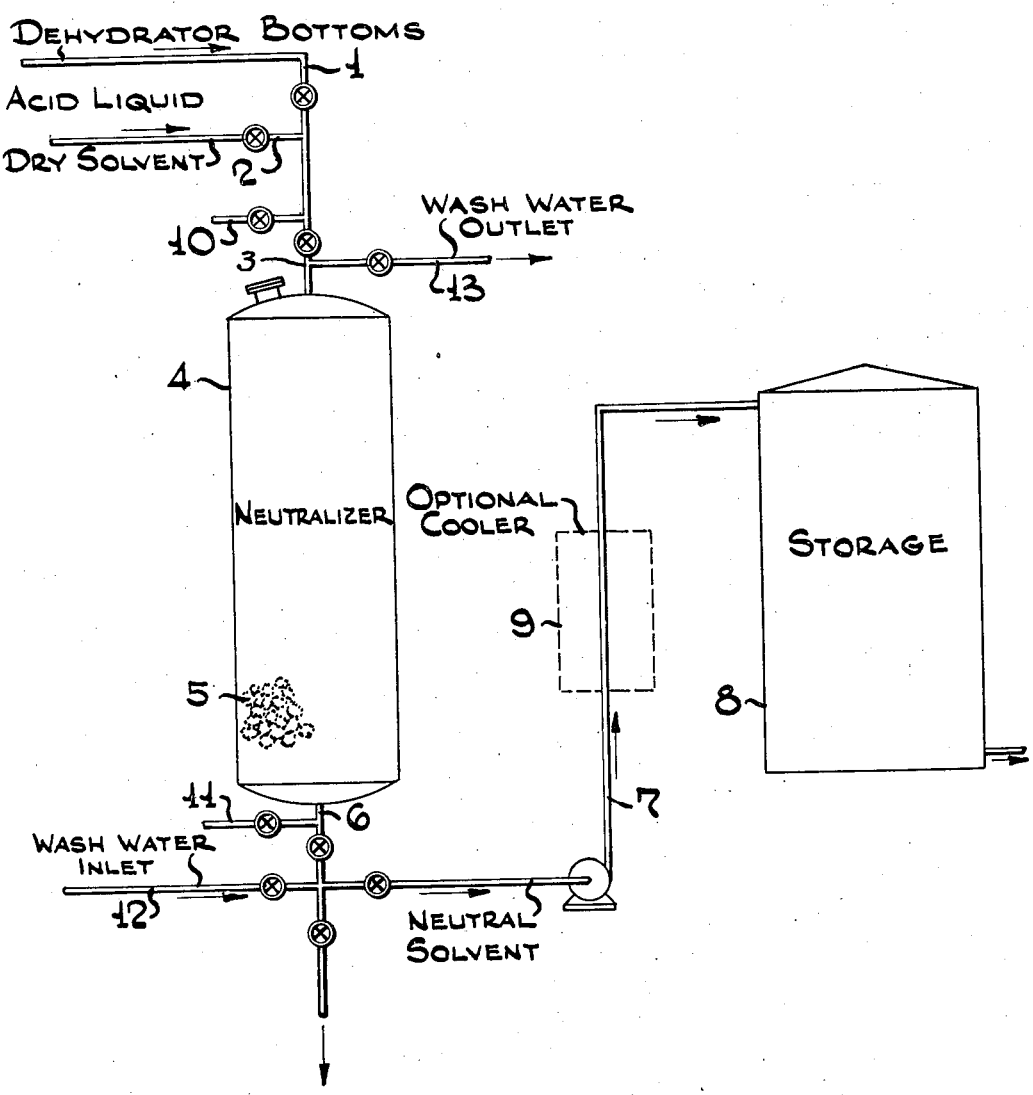

2,467,394

UNITED STATES PATENT OFFICE 2,467,394

PURIFICATION OF HALOGENATED HYDROCARBON SOLVENTS

John B. Lovell and Mack C. Fuqua, Baton Rouge, La., assignors to Standard Oil Development Company, a corporation of Delaware Application August 1, 1945, Serial No. 608,326

4 Claims. (Cl. 260—652)

This invention relates to the purification of halogenated hydrocarbon solvents, more particularly for the purpose of removing small amounts of halogen acid contained therein. More particularly, the invention relates to the purification of chlorinated hydrocarbons having one to six carbon atoms, which are used as solvents for the dewaxing of petroleum oils.

In the past, considerable difficulty has been encountered in the maintenance and operation of solvent dewaxing plants employing chlorinated solvents such as ethylene dichloride, carbon tetrachloride, etc., or mixed solvents, as a result of the breaking down of the solvent to form mineral acid, usually hydrochloric acid.

The relatively high original cost of these solvents makes it necessary that these solvents be recovered. The use of distillation as a means of recovering the solvent leads to the subjection of the chlorinated solvent to elevated temperatures in the presence of iron and water resulting in the breaking down of the solvent to form acid. As it is undesirable to have water in the solvent because of resulting ice formation at the low chilling temperatures used in solvent dewaxing, e. g., about 0° to —25° F., it is impractical to use any alkaline solutions for the neutralization of the acid unless such a neutralization is followed by dehydration of the solvent. As such a dehydration step is often expensive and sometimes impractical because of the size of the equipment required, some method of neutralization not employing aqueous solutions is desirable.

It has heretofore been suggested that small amounts of water and acid may be removed from chlorinated solvents, such as used in the dry cleaning industry, by vaporizing the solvent and any water present to separate them from any dirt and grease present, then condensing the vapors and passing the condensate through a cellulosic material such as cotton which has been impregnated with an alkali such as sodium carbonate, the cotton serving to absorb the water and the alkali serving to neutralize the acid. However, such a process is expensive and impractical in regard to the use of the cotton since it could only be used a short time and then would have to be regenerated by washing free of any alkali or salts deposited on the surface thereof, re-impregnating by contacting with an aqueous solution of alkali carbonate, and drying.

One object of the present invention is to avoid such repeated impregnation and drying steps, and to also completely avoid the use of any absorbent whatsoever.

Broadly, the present invention comprises contacting the halogenated hydrocarbon liquid which contains a small amount of halogen acid, with comminuted solid particles consisting of alkali such as sodium carbonate. The invention may be carried out by percolating the liquid through a bed of solid alkali in the form of pellets, lumps, or flakes, or other suitable particles, preferably having a screen size between the approximate limits of ½ to 2 mesh per inch. If the particles are much smaller than such finer size limit, some of the particles may be entrained with the liquid, and this is undesirable because of line plugging and product contamination. On the other hand if the alkali particles are much larger than the coarser size limit mentioned above, the surface area exposed to contact with the liquid is not great enough for best efficiency, and would require a treating equipment of unnecessarily large capacity.

During contact of the halogenated hydrocarbon liquid with the alkali particles, the latter react chemically with and neutralize whatever halogen acid is present in the liquid, with the resulting deposition of the corresponding acid salt on the surface of the solid alkali. This is an important feature of the invention, because if such resultant alkali salts, e. g., sodium chloride, were dispersed either by solution or suspension in the halogenated hydrocarbon liquid, that would later cause trouble, such as by settling out in cooling coils, storage tanks, distillation equipment, etc., and would also cause excessive wearing of any moving metal parts coming in contact therewith, such as pumps, valves, etc. Normally, the neutralization of acid contained in the halogenated hydrocarbon liquid by the alkali takes place fairly rapidly, although the necessary time of contact may vary inversely somewhat with the temperature, requiring slightly longer treatment at low temperatures for higher concentrations of acid in the halogenated hydrocarbon liquid. Usually, however, the temperature at which the neutralization is carried out may range from about 0 to 150° F., preferably about 32 to 100° F., and the time of contact should be about 1 to 30 minutes. Although the process can be operated by batch, it is preferably carried out continuously, and accordingly the rate of flow through the neutralizing tank should be adjusted to give the desired contact time at any given temperature.

After the alkali percolation bed has been used for treating a substantial volume of acid-containing liquid to such extent that its neutralization efficiency is substantially impaired by salt deposited on the particle surface, the alkali bed may be reactivated or regenerated by washing, preferably in a countercurrent direction, i. e., by backwashing, with water or an aqueous solution of the alkali, or any other suitable solvent for the salt deposit. The temperature and time of contact of such washing step should be adjusted to substantially remove all salt deposit without removing more than a relatively minor proportion of the alkali comprising the main body of the solid alkali particles. For instance, a temperature range of about 35 to 150° F. and time of contact of about 1 to 10 minutes will ordinarily be sufficient for this reactivation step using, of course, the longer contact time with the lower temperature and vice versa.

The invention is believed to apply particularly to the purification of liquids comprising or consisting of chlorinated hydrocarbons having one to six carbon atoms and particularly one to two carbon atoms, and preferably such chlorinated hydrocarbons having at least two chlorine atoms per molecule. Specific examples of such chlorinated hydrocarbon atoms are ethylene dichloride ($C_2H_4Cl_2$), carbon tetrachloride ($CCl_4$), chloroform ($CHCl_3$), trichlorethane ($C_2H_3Cl_3$), tetrachlorethan ($C_2H_2Cl_4$), etc. Mixtures of these various liquids may be used. The invention, in its broader aspects may also be applied to other halogenated hydrocarbon liquids such as $CH_3Cl$, $C_2H_5Cl$, $C_2H_5Br$, $C_2H_4Br_2$, $CF_2Cl_2$, $CH_2Cl_2$, $C_6H_5Cl$, etc.

The particular requirements for halogenated hydrocarbon liquids to be used as solvents in the solvent dewaxing of petroleum oils are solubility of the oil and the wax contained therein with a selective solubility for one of the components at varying temperatures. One particular liquid found very suitable for solvent dewaxing consists of a mixture of 75% by volume of ethylene dichloride and 25% by volume of carbon tetrachloride. This mixture is especially suitable because it has a selective solubility for the oil at reduced temperatures and also contains enough carbon tetrachloride to reduce the inflammability to the point where explosion-proof equipment is not required.

Although soda ash is the preferred alkali to be used, because of its efficiency, low cost, and availability in large quantities, other alkalis may be used such as caustic soda, $Ca(OH)_2$, $Ba(OH)_2$. The particular form of soda ash found most suitable is the commercially available form called "dense ash tailings"; this product has an approximate screen size of about 2 to ½ mesh per inch.

An advantage of this invention is that both the maintenance and original cost of certain solvent dewaxing plants is reduced. The maintenance necessary because of corrosion to the plant is reduced appreciably and the original cost is reduced by virtue of the fact that steel equipment can be used instead of expensive corrosion-resistant alloys.

Another advantage of this invention is that the neutralization of the acid is accomplished without the addition of any water to the solvent, thereby eliminating the necessity of an expensive dehydration step.

The objects, advantages, and details of the invention will be better understood from the following description of illustrative equipment for carrying out the invention, particularly when read in conjunction with the accompanying drawing, and also from a consideration of the experimental data given hereinafter.

Referring to the accompanying drawing which is a schematic layout of suitable equipment for carrying out the invention, acid liquid, i. e., acid-containing halogenated hydrocarbon liquid, is fed, either as dehydrator bottoms through line 1 or as dry solvent through line 2, or both of these can be fed through a single line, thence through line 3 into neutralizer tank 4 which contains lumps or pellets of soda ash 5, with a temperature and time of contact controlled so substantially completely neutralize all halogen acid present in the liquid. Then the neutralized liquid is withdrawn by discharge line 6 and thence pumped through line 7 into storage tank 8, an optional cooler 9 being used if desired to cool the neutralized liquid before passing into the storage tank.

Sample cocks 10 and 11 are used for obtaining samples of the liquid before entering and after leaving the neutralizer 4, so as to serve as a check on the neutralization efficiency of the alkali contained therein. When this efficiency is substantially impaired, the neutralizing treatment is either stopped completely, or carried on in one or more alternate neutralizing tanks not shown, so as to permit reactivation of the alkali 5 which has become coated with alkali halide salt. To effect this reactivation, a suitable wash liquid such as water or aqueous solution of soda ash, supplied through line 12, is fed into neutralizer 4, preferably counter-currently, i. e., as a backwash, through line 6, and discharged through the wash water outlet 13, from which, if desired, it may be passed to a suitable wash-liquid regeneration zone, not shown, in which for instance the excess alkali halide salts may be crystallized out and removed by filtration, centrifuging, or other suitable means. The backwashing is continued until all or the desired portion of alkali halide salt deposit has been removed from the surface of the alkali lumps or pellets.

After the reactivation is completed, the neutralizer 4 is again ready for use in neutralizing further amounts of fresh acid liquid. If desired, after reactivation, and before further use for neutralizing purposes, air or other suitable gaseous medium such as natural gas, nitrogen may be blown through the neutralizer 4 in order to dry the reactivated solid particles of alkali, so as to avoid unnecessarily contaminating the halogenated hydrocarbon liquid passing therethrough with water, which tends to accelerate hydrolysis of the halogenated hydrocarbons to form further halogen acid.

When the neutralized halogenated hydrocarbon liquid is withdrawn from storage tank 8 for use in a solvent dewaxing process or for other purposes, it may be filtered or otherwise treated in order to make certain that it is in proper condition for use.

*Example 1*

A mixed solvent consisting of about 75% by volume of ethylene dichloride ($C_2H_4Cl_2$), and 25% by volume of carbon tetrachloride ($CCl_4$), was used for solvent dewaxing a vacuum tower distillate of petroleum lubricating oil mixture of two base stocks having viscosities of about 145–150 and 385–395 seconds Saybolt at 100° F., by diluting the oil with about 300 volume per cent of solvent, at a temperature of about 150° F., and then cooling to about 0° to −25° F., to precipitate wax crystals, and centrifuging or filtering. The solvent-oil mixture was heated up to a final temperature of about 270° F. and at a gauge pressure of about 0–5#, to remove the solvent from the oil, the solvent vapors being condensed for reuse. This condensed solvent which contained about 0.0008% by weight of hydrochloric acid, indicated by a pH of about 3.5, was then neutralized by percolating it through a bed of soda ash pellets, having a size of about ½ to 2 mesh per inch, at a temperature of about 120° F. and with a contact time of about 30 minutes. The treated solvent showed that the acid had been substantially completely removed, as the liquid had a pH of about 6.5. The cloud point of the treated product was below −20° F. and, therefore, would be suitable for re-use in the solvent dewaxing process. This test indicated that about 500 barrels of the acid-containing chlorinated solvent could be successfully treated with one ton of the soda ash pellets. From 0° F. to +30° F., cloud point is used as an indication of the moisture content of the solvent; a cloud point of −20° F. or lower indicates that the solvent is sufficiently dry for re-use.

This invention is believed particularly applicable to mixed chlorinated solvents containing about 10% to 40% of carbon tetrachloride and 90% to 60% of ethylene dichloride.

*Example 2*

Another test was carried out by continuously neutralizing a mixed acid-containing solvent similar to that used in Example 1, by carrying out the neutralization in a horizontal drum about 5 feet in diameter and about 15 feet long, into which was placed about two tons of dry sodium carbonate identified commercially as "dense ash tailings." The acid-containing chlorinated solvent was continuously passed through this neutralizer drum at an average flow rate of about 175 gallons per minute, which amounted to a contact time of about 20 minutes, at a temperature of about 110° F. for 15 days, although the actual rate of flow varied substantially from time to time during the test. The acidity of the chlorinated solvent at the inlet and outlet of the drum as determined at various periods throughout the test is shown in the following table.

| Number of Days | pH Values | |
|---|---|---|
| | Drum Inlet | Drum Outlet |
| 0 | 4.3 | 9.2 |
| 1 | 4.2 | 4.4 |
| 2 | 4.4 | 5.2 |
| 3 | 5.0 | 6.1 |
| 4 | 6.3 | 6.8 |
| 5 | 6.2 | 6.5 |
| 8 | 6.1 | 6.4 |
| 10 | 4.9 | 5.2 |
| 12 | 5.9 | 6.2 |
| 15 | 6.1 | 6.4 |

The data in the above table indicate that substantial neutralization has taken place during passage of the acid-containing solvent through the soda ash drum, although there is considerable variation in the acid content of the chlorinated solvent being treated from day to day and the flow rate was, on certain days, too fast for satisfactory neutralization, i. e., for raising the pH up to at least 6.0, or preferably 6.5. This can, of course, be regulated by maintaining a slower flow rate through the neutralizing tank, with the use, if necessary, of a surge tank and automatic flow meter to help take care of variation in the flow rate of the acid-containing solvent coming from the dewaxing plant.

When the alkali lumps had been coated with sodium chloride to such an extent as to interfere with the satisfactory neutralization of acid in the solvent, the coated soda ash was washed with water by by-passing the solvent around the drum and back washing with water at a temperature of about 85° F. with rates of 75 gallons per minute giving a contact time of 20 minutes. This backwashing was continued until a visual inspection of the outlet water showed the water to be sufficiently clear to indicate satisfactory removal of the deposited salt. The water flow was then blocked out and the solvent flow was directed through the drum again. It was estimated that the loss in soda ash by this washing treatment only amounted to about 500 to 700 lbs., as compared to an original charge of 4,000 lbs., the loss, therefore, amounting to about 12% to 17%, or roughly 15%, including both that removed as NaCl as well as Na$_2$CO$_3$.

In plant operation according to this invention, the solvent recovery system consists of 5 towers. Two of these, the petrolatum evaporator and the dewaxed oil evaporator do not use open steam stripping and their overhead is called "dry solvent." The other three towers, namely the petrolatum stripper, the dewaxed oil stripped, and the solvent dehydrator, use open steam and thus have a wet overhead. The combined overheads of these three are fed to the solvent dehydrator where water and some solvent are carried overhead. The bottoms from the dehydrator are the stream called "dehydrator bottoms," and contain pure solvent.

It is not intended that this invention be limited to the specific examples which have been given merely for the sake of illustration, nor by the particular equipment suggested as illustrative, but only by the appended claims in which it is intended to claim all novelty inherent in the invention as well as modifications coming within the scope and spirit of the invention.

What is claimed is:

1. A process for neutralizing a substantially water-free halogenated hydrocarbon solvent contaminated with mineral acid which comprises contacting the said acid-containing solvent with dry solid alkali pellets having a screen size of about 2 to ½ mesh per sq. in. so as to react the acid component of the said solvent on the surface of the alkali pellets whereby salt of the acid is deposited on the surface of the said pellets, washing said pellets with an aqueous solvent at a temperature in the range of about 35°–150° F. and for a time interval of about 1–10 minutes to remove said salt deposit and no more than a relatively minor proportion of said alkali and drying said pellets with a blast of a gaseous drying medium prior to reuse of said pellets.

2. A process as described in claim 1 in which said dry solid alkali pellets comprise essentially soda ash.

3. In the process described in claim 1 washing said pellets with the aqueous solvent passed through the pellets countercurrent to the direction in which the solvent was passed during its contact with said pellets.

4. A process for neutralizing mineral acidity in a substantially water-free solvent consisting essentially of about 10 to 40 percent of carbon tetrachloride and about 90 to 60 percent of ethylene dichloride contaminated by halogen acid, which comprises contacting said acid-containing solvent with soda ash pellets having a screen size of about 2 to ½ mesh per square inch until said soda ash water-free condition becomes coated with sodium halide during treatment of the solvent, thereafter washing the sodium halide coating from the soda ash pellets with an aqueous solvent for the sodium halide at a temperature in the range of about 35°–150° F. and for a time interval of about 1–10 minutes, whereby no more than a relatively minor proportion of said soda ash pellets is removed, and drying the resulting washed soda ash pellets with a blast of air prior to re-use of said pellets for neutralizing further quantities of the solvent contaminated by halogen acid.

JOHN B. LOVELL.
MACK C. FUQUA.

REFERENCES CITED

The following references are of record in the file of this patent:

UNITED STATES PATENTS

| Number | Name | Date |
|---|---|---|
| 1,817,893 | Curme | Aug. 4, 1931 |
| 2,193,569 | Seaton | Mar. 12, 1940 |
| 2,193,570 | Seaton | Mar. 12, 1940 |
| 2,375,460 | Barbre | May 8, 1945 |